(12) United States Patent
Gupta et al.

(10) Patent No.: US 8,923,916 B2
(45) Date of Patent: Dec. 30, 2014

(54) OUT-OF-SERVICE SCANNING IN MOBILE EQUIPMENT HAVING TWO OR MORE MODEMS

(71) Applicant: QUALCOMM Incorporated, San Diego, CA (US)

(72) Inventors: Sudhendra K Gupta, San Diego, CA (US); Wei Qi, San Diego, CA (US); Nam Soo Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 84 days.

(21) Appl. No.: 13/801,245

(22) Filed: Mar. 13, 2013

(65) Prior Publication Data

US 2014/0004856 A1    Jan. 2, 2014

Related U.S. Application Data

(60) Provisional application No. 61/665,708, filed on Jun. 28, 2012.

(51) Int. Cl.
| | |
|---|---|
| H04M 1/00 | (2006.01) |
| H04W 48/16 | (2009.01) |
| H04W 24/02 | (2009.01) |
| H04W 64/00 | (2009.01) |
| H04W 88/06 | (2009.01) |

(52) U.S. Cl.
CPC .............. *H04W 24/02* (2013.01); *H04W 64/00* (2013.01); *H04W 48/16* (2013.01); *H04W 88/06* (2013.01)
USPC ...................... 455/552.1; 455/553.1; 455/434

(58) Field of Classification Search
CPC ...... H04W 24/02; H04W 48/16; H04W 88/06
USPC ............................................ 455/552.1, 553.1
See application file for complete search history.

(56) References Cited

U.S. PATENT DOCUMENTS

| | | | |
|---|---|---|---|
| 8,200,225 | B2 | 6/2012 | Huang et al. |
| 2006/0209798 | A1* | 9/2006 | Oikarinen et al. ............ 370/352 |

(Continued)

FOREIGN PATENT DOCUMENTS

| | | |
|---|---|---|
| EP | 1928200 A1 | 6/2008 |
| EP | 1995894 A1 | 11/2008 |
| KR | 20110104222 A | 9/2011 |

OTHER PUBLICATIONS

International Search Report and Written Opinion—PCT/US2013/042722—ISA/EPO—Oct. 9, 2013.

*Primary Examiner* — Nathan Mitchell
*Assistant Examiner* — Dung Lam
(74) *Attorney, Agent, or Firm* — Fulbright & Jaworski LLP

(57) ABSTRACT

Out-of-service (OOS) scanning in mobile equipment is disclosed in mobile equipment having two or more modems. The OOS scans are performed for one of the modems. A determination is made that a first status exists in response to detection that one of the OOS scans proved unsuccessful. Another determination is made that a second status exists in response to detecting that one other of the modems is not experiencing an OOS condition. In response to existence of the first status and the second status, information is utilized from the other of the modems to make a determination whether a third status exists. A determination is made, conditioned at least in part on existence of the third status, whether to perform another of the OOS scans.

44 Claims, 8 Drawing Sheets

(56) References Cited

U.S. PATENT DOCUMENTS

| | | |
|---|---|---|
| 2006/0217147 A1 | 9/2006 | Olvera-Hernandez et al. |
| 2009/0068970 A1 | 3/2009 | Ahmed et al. |
| 2010/0067434 A1* | 3/2010 | Siu et al. .................. 370/328 |
| 2010/0167731 A1 | 7/2010 | Horodezky et al. |
| 2011/0003590 A1 | 1/2011 | Yoon et al. |
| 2011/0141939 A1 | 6/2011 | Medapalli |

* cited by examiner

OUT-OF-SERVICE SCANNING IN MOBILE EQUIPMENT HAVING TWO OR MORE MODEMS

CROSS-REFERENCE TO RELATED APPLICATIONS

This application claims the benefit of U.S. Provisional Patent Application No. 61/665,708, entitled, "OUT-OF-SERVICE SCANNING IN MOBILE EQUIPMENT HAVING TWO OR MORE MODEMS", filed on Jun. 28, 2012, which is expressly incorporated by reference herein in its entirety.

BACKGROUND

1. Field

Aspects of the present disclosure relate generally to out-of-service scanning in mobile equipment in wireless communication systems.

2. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of eNodeBs that can support communication for a number of user equipments (UEs). A UE may communicate with an eNodeB via the downlink and uplink. The downlink (or forward link) refers to the communication link from the eNodeB to the UE, and the uplink (or reverse link) refers to the communication link from the UE to the eNodeB.

SUMMARY

Techniques for performing out-of-service scanning in mobile equipment having two or more modems are described herein.

In an aspect, a method for performing out-of-service scanning in mobile equipment having two or more modems includes performing out-of-service scans for one of the two or more modems. A determination is made that a first status exists in response to detection that one of the out-of-service scans proved unsuccessful. A determination is made that a second status exists in response to detection that one other of the two or more modems is not experiencing an out-of-service condition. In response to existence of the first status and the second status, information is utilized from the other of the two or more modems to make a determination whether a third status exists. A determination is made, conditioned at least in part on existence of the third status, whether to perform another of the out-of-service scans.

In another aspect, an apparatus for performing out-of-service scanning in mobile equipment having two or more modems includes means for performing out-of-service scans for one of the two or more modems. Means are also included for making a determination that a first status exists in response to detection that one of the out-of-service scans proved unsuccessful. Means are additionally included for making a determination that a second status exists in response to detection that one other of the two or more modems is not experiencing an out-of-service condition. Means are also included for, in response to existence of the first status and the second status, utilizing information from the other of the two or more modems to make a determination whether a third status exists. Means are further included for making a determination, conditioned at least in part on existence of the third status, whether to perform another of the out-of-service scans.

In an additional aspect, a computer program product includes a non-transitory computer-readable medium including code for causing a computer to perform, in mobile equipment having two or more modems, out-of-service scans for one of the two or more modems. Code is also included for causing a computer to make a determination that a first status exists in response to detection that one of the out-of-service scans proved unsuccessful. Code is further included for causing a computer to perform detection that one other of the two or more modems is not experiencing an out-of-service condition. Code is additionally included for causing a computer to make a determination that a second status exists in response to detection that one other of the two or more modems is not experiencing an out-of-service condition. Code is also included for causing a computer, in response to existence of the first status and the second status, to utilize information from the other of the two or more modems to make a determination whether a third status exists. Code is further included for causing a computer to make a determination, conditioned at least in part on existence of the third status, whether to perform another of the out-of-service scans.

In a further aspect, a user equipment (UE) having two or more modems, includes at least one processor, and a memory coupled to the at least one processor. The at least one processor is configured to perform out-of-service scans for one of the two or more modems and make a determination that a first status exists in response to detection that one of the out-of-service scans proved unsuccessful. The at least one processor is additionally configured to make a determination that a second status exists in response to detection that one other of the two or more modems is not experiencing an out-of-service condition. The at least one processor is also configured, in response to existence of the first status and the second status, to utilize information from the other of the two or more modems to make a determination whether a third status exists. The at least one processor is further configured to make a determination, conditioned at least in part on existence of the third status, whether to perform another of the out-of-service scans.

Various aspects and features of the disclosure are described in further detail below.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
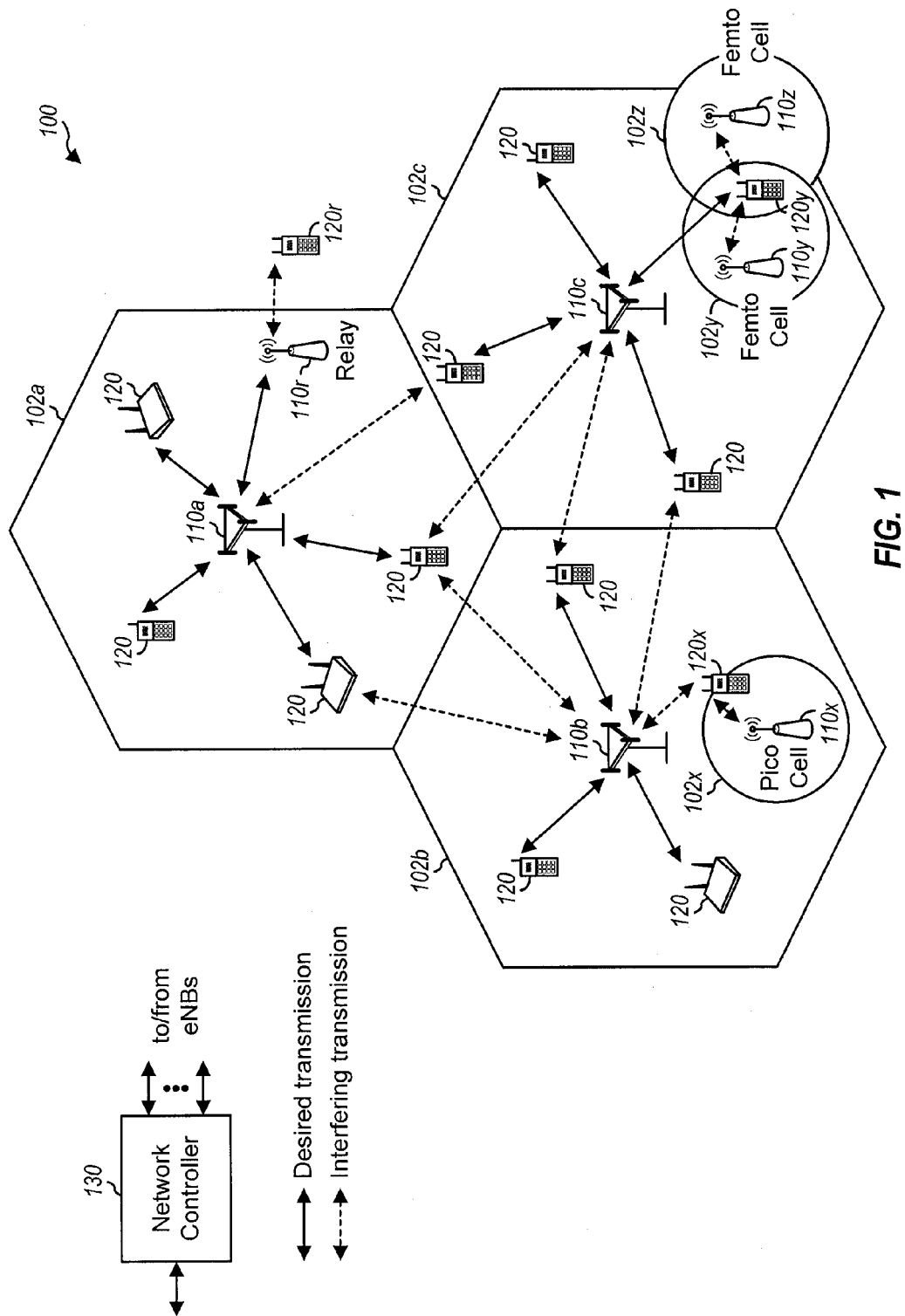
FIG. 1 is a block diagram conceptually illustrating an example of a telecommunications system.

FIG. 1 shows a wireless communication network 100, which may be an LTE network. The wireless network 100 may include a number of evolved Node Bs (eNodeBs) 110 and other network entities. An eNodeB may be a station that communicates with the UEs and may also be referred to as a base station, an access point, etc. A Node B is another example of a station that communicates with the UEs.

Each eNodeB 110 may provide communication coverage for a particular geographic area. In 3GPP, the term "cell" can refer to a coverage area of an eNodeB and/or an eNodeB subsystem serving this coverage area, depending on the context in which the term is used.

An eNodeB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNodeB for a macro cell may be referred to as a macro eNodeB. An eNodeB for a pico cell may be referred to as a pico eNodeB. An eNodeB for a femto cell may be referred to as a femto eNodeB or a home eNodeB. In the example shown in FIG. 1, the eNodeBs 110*a*, 110*b* and 110*c* may be macro eNodeBs for the macro cells 102*a*, 102*b* and 102*c*, respectively. The eNodeB 110*x* may be a pico eNodeB for a pico cell 102*x*. The eNodeBs 110*y* and 110*z* may be femto eNodeBs for the femto cells 102*y* and 102*z*, respectively. An eNodeB may support one or multiple (e.g., three) cells.

The wireless network 100 may also include relay stations. A relay station is a station that receives a transmission of data and/or other information from an upstream station (e.g., an eNodeB or a UE) and sends a transmission of the data and/or other information to a downstream station (e.g., a UE or an eNodeB). A relay station may also be a UE that relays transmissions for other UEs. In the example shown in FIG. 1, a relay station 110*r* may communicate with the eNodeB 110*a* and a UE 120*r* in order to facilitate communication between the eNodeB 110*a* and the UE 120*r*. A relay station may also be referred to as a relay eNodeB, a relay, etc.

The wireless network 100 may be a heterogeneous network that includes eNodeBs of different types, e.g., macro eNodeBs, pico eNodeBs, femto eNodeBs, relays, etc. These different types of eNodeBs may have different transmit power levels, different coverage areas, and different impact on interference in the wireless network 100. For example, macro eNodeBs may have a high transmit power level (e.g., 20 Watts) whereas pico eNodeBs, femto eNodeBs and relays may have a lower transmit power level (e.g., 1 Watt).

The wireless network 100 may support synchronous or asynchronous operation. For synchronous operation, the eNodeBs may have similar frame timing, and transmissions from different eNodeBs may be approximately aligned in time. For asynchronous operation, the eNodeBs may have different frame timing, and transmissions from different eNodeBs may not be aligned in time. The techniques described herein may be used for both synchronous and asynchronous operation.

A network controller 130 may couple to a set of eNodeBs and provide coordination and control for these eNodeBs. The network controller 130 may communicate with the eNodeBs 110 via a backhaul. The eNodeBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, etc. A UE may be able to communicate with macro eNodeBs, pico eNodeBs, femto eNodeBs, relays, etc. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

Figure 2:
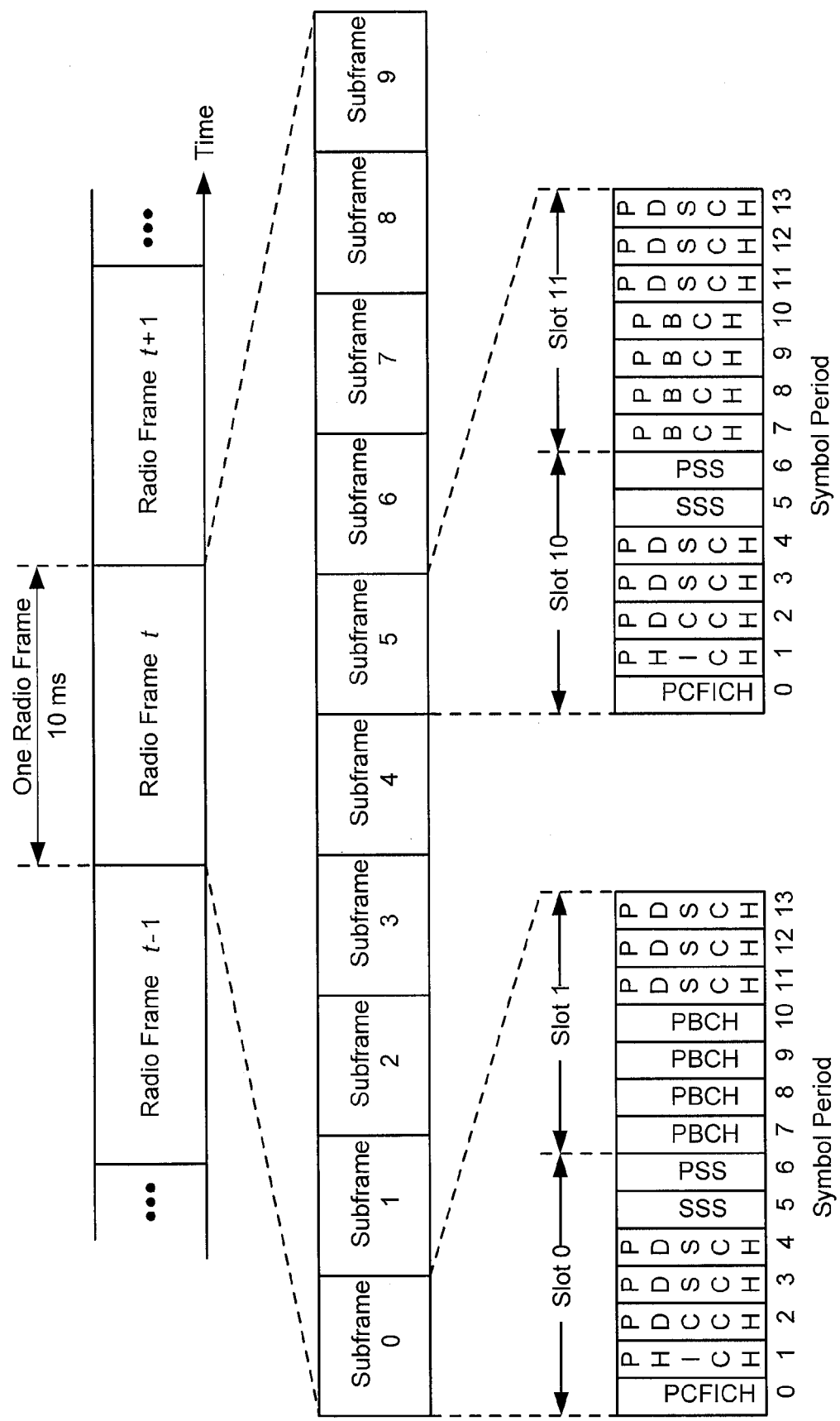
FIG. 2 is a block diagram conceptually illustrating an example of a down link frame structure in a telecommunications system.

FIG. 2 shows a down link frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 14 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNodeB may send a primary synchronization signal (PSS) and a secondary synchronization signal (SSS) for each cell in the eNodeB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNodeB may send a Physical Broadcast Channel (PBCH) in symbol periods 0 to 3 in slot 1 of subframe 0. The PBCH may carry certain system information.

The eNodeB may send a Physical Control Format Indicator Channel (PCFICH) in only a portion of the first symbol period of each subframe, although depicted in the entire first symbol period in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNodeB may send a Physical HARQ Indicator Channel (PHICH) and a Physical Downlink Control Channel (PDCCH) in the first M symbol periods of each subframe (M=3 in FIG. 2). The PHICH may carry information to support hybrid automatic retransmission (HARQ). The PDCCH may carry information on uplink and downlink resource allocation for UEs and power control information for uplink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The eNodeB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNodeB may send the PSS, SSS and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to specific UEs in specific portions of the system bandwidth. The eNodeB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNodeB may send the PDCCH to the UE in any of the combinations that the UE will search.

A UE may be within the coverage of multiple eNodeBs. One of these eNodeBs may be selected to serve the UE. The serving eNodeB may be selected based on various criteria such as received power, path loss, signal-to-noise ratio (SNR), etc.

Figure 3:
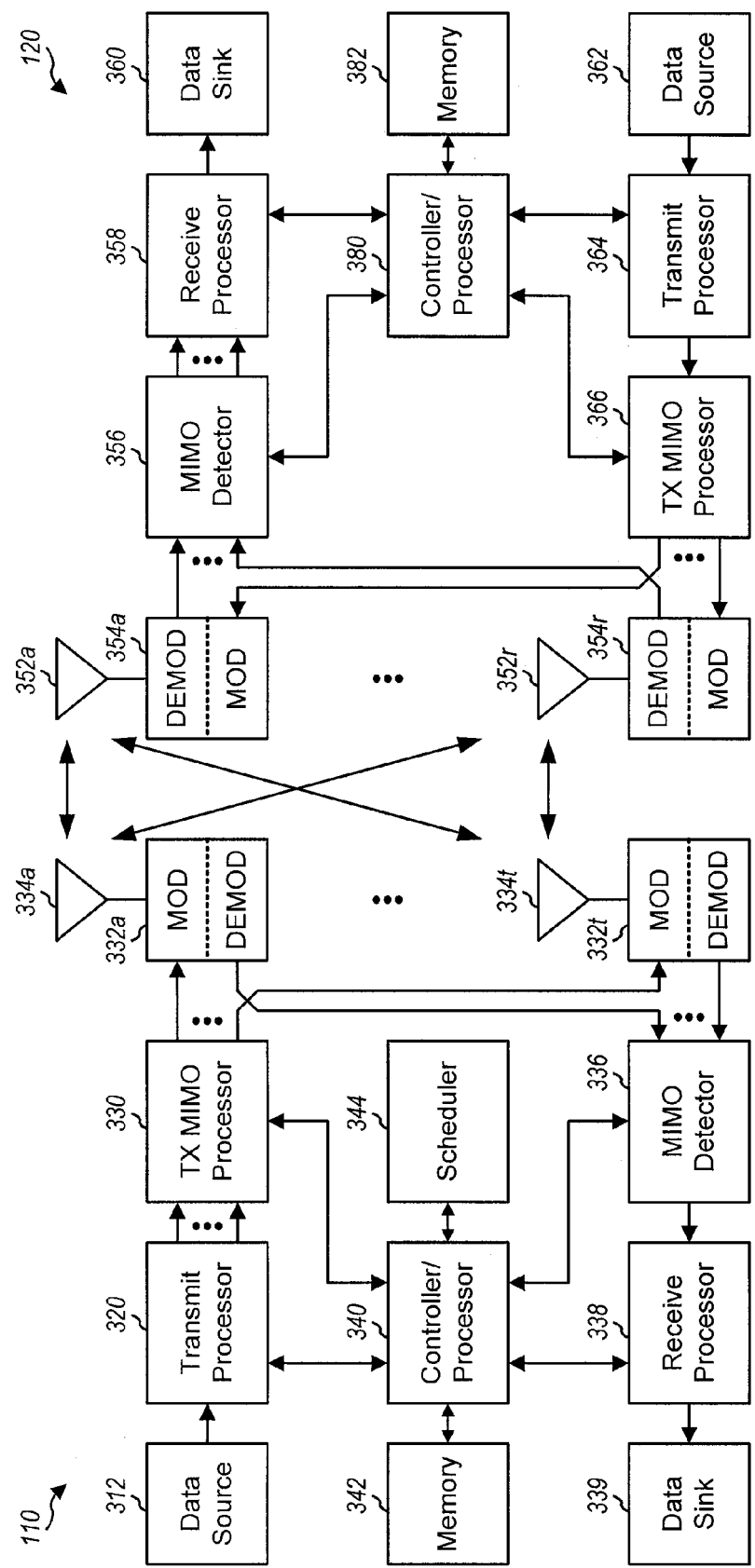
FIG. 3 is a block diagram conceptually illustrating a design of an eNodeB and a UE configured according to one aspect of the present disclosure.

FIG. 3 shows a block diagram of a design of an eNodeB 110 and a UE 120, which may be one of the eNodeBs and one of the UEs in FIG. 1. For a restricted association scenario, the eNodeB 110 may be the macro eNodeB 110c in FIG. 1, and the UE 120 may be the UE 120y. The eNodeB 110 may be equipped with antennas 334a through 334t, and the UE 120 may be equipped with antennas 352a through 352r.

At the eNodeB 110, a transmit processor 320 may receive data from a data source 312 and control information from a controller/processor 340. The control information may be for the PBCH, PCFICH, PHICH, PDCCH, etc. The data may be for the PDSCH, etc. The processor 320 may process (e.g., encode and symbol map) the data and control information to obtain data symbols and control symbols, respectively. The processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the eNodeB 110 and may provide received signals to the demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The transmit processor 364 may also generate reference symbols for a reference signal. The symbols from the transmit processor 364 may be precoded by a TX MIMO processor 366 if applicable, further processed by the demodulators 354a through 354r (e.g., for SC-FDM, etc.), and transmitted to the eNodeB 110. At the eNodeB 110, the uplink signals from the UE 120 may be received by the antennas 334, processed by the modulators 332, detected by a MIMO detector 336 if applicable, and further processed by a receive processor 338 to obtain decoded data and control information sent by the UE 120. The receive processor 338 may provide the decoded data to a data sink 339 and the decoded control information to the controller/processor 340.

The controllers/processors 340 and 380 may direct the operation at the eNodeB 110 and the UE 120, respectively. The processor 340 and/or other processors and modules at the eNodeB 110 may perform or direct the execution of various processes for the techniques described herein. The processor 380 and/or other processors and modules at the UE 120 may also perform or direct the execution of the functional blocks illustrated in FIGS. 4-8, and/or other processes for the techniques described herein. The memories 342 and 382 may store data and program codes for the eNodeB 110 and the UE 120, respectively. A scheduler 344 may schedule UEs for data transmission on the downlink and/or uplink.

Figure 4:
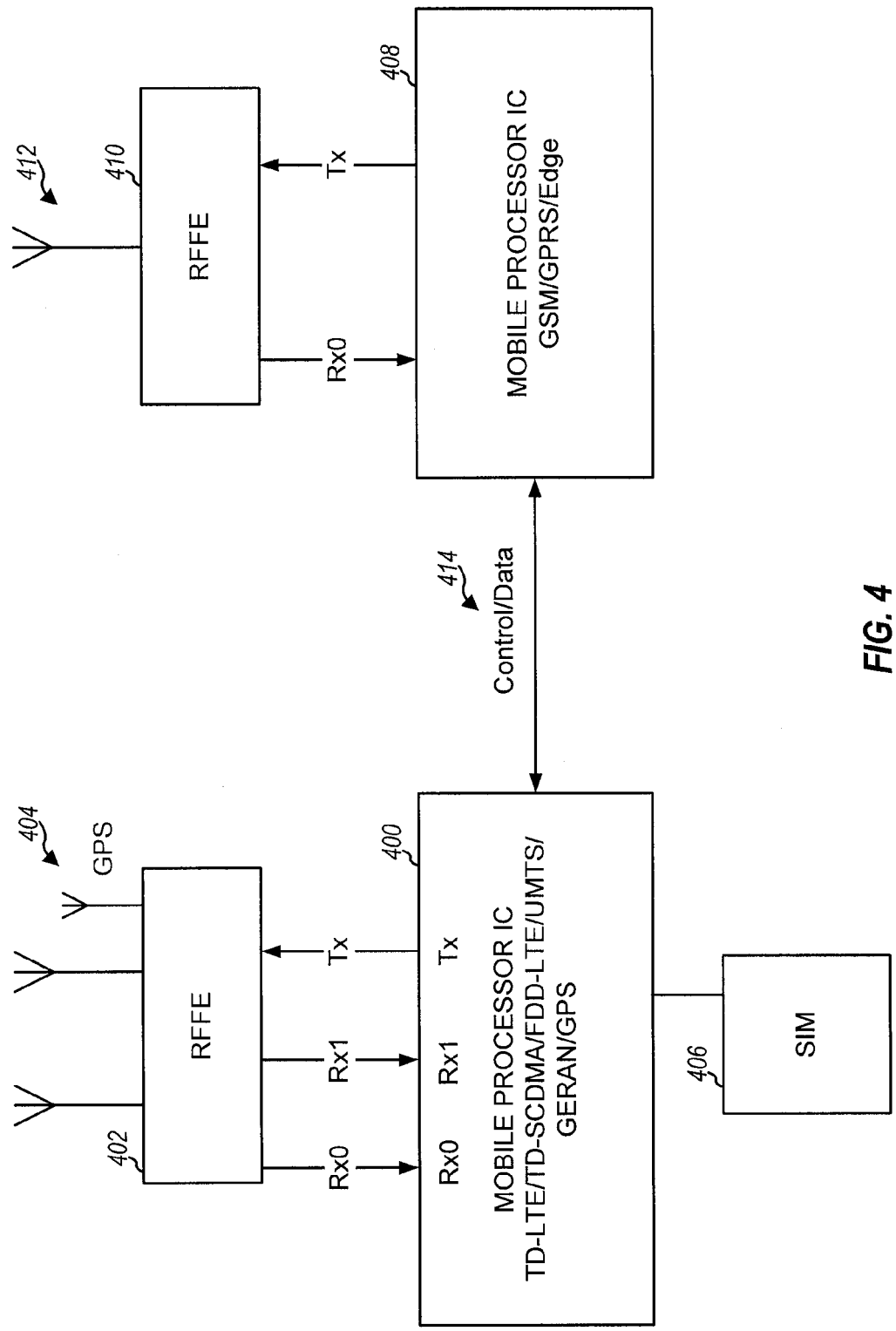
FIG. 4 discloses an apparatus for performing out-of-service scanning in mobile equipment having two or more modems.

FIG. 4 shows an apparatus for performing out-of-service scanning in mobile equipment having two or more modems. The apparatus may be a mobile equipment, a UE, such as UE 120 (FIG. 3), and/or a wireless communication device, etc. In some aspects, two modems may be provided to a single processor. In other aspects, two processors may each have a modem. In still other aspects, a dual modem processor may interface with another processor also having a modem. It should further be appreciated that a modem may utilize more than one antenna, and that multiple modems may share a single antenna.

In a dual processor implementation, a first mobile processor integrated circuit 400 may have a first radio frequency front end 402 and a plurality of antennas 404, including a Global Positioning System (GPS) capability. A subscriber identity module 406 may provide data storage for mobile processor integrated circuit 400. Mobile processor integrated circuit 400 may have one or more mobile communications capabilities, such as Time Division Long Term Evolution (TD-LTE), Time Division Synchronous Code Division Multiple Access (TD-SCDMA), Frequency Division Duplex Long Term Evolution (FDD-LTE), UMTS, GSM Edge Radio Access Network (GERAN), and/or GPS. The MSM8960 mobile processor integrated circuit may be one example of mobile processor integrated circuit 400.

A second mobile processor integrated circuit 408 may have a second radio frequency front end 410 and one or more antennas 412. Mobile processor integrated circuit 408 may have one or more mobile communications capabilities, such as GSM, General Packet Radio Service (GPRS), and/or Edge, etc. Mobile processor integrated circuits 400 and 408 may exchange control/data signals 414 as will be readily appreciated by one skilled in the art of dual modem processors, such as simultaneous GSM and LTE (SGLTE).

As will be readily understood, mobile processor integrated circuits 400 and 408 are capable of performing out-of-service scans and full service scans independently of one another. For example, mobile processor integrated circuit 408 may perform an out-of-service scan. In relation to UE 120, mobile processor integrated circuit 408 as one of the processors of controller/processor 380 allows UE 120 to perform an out-of-service scan by transmitting scan signals via transmit processor 364, receive processor 358, TX MIMO processor 366, modulator/demodulators 354a-r, and antennas 352a-r. The combination of these components and acts may provide means for performing out-of-service scans for one of the two or more modems.

In example operation, UE 120 monitors for scan responses in order to determine whether the modem controlled by mobile processor integrated circuit 408 is in an out-of-service state. Mobile processor integrated circuit 408 monitors for any scan response signals over antennas 352a-r, modulator/demodulators 354a-r, MIMO detector 356, and receive processor 358. When no such scan response signals are detected, mobile processor integrated circuit 408 determines that a first status, such as an out-of-service status exists. The combination of these components and acts may provide means for determining that a first status exists in response to detection that one of the out-of-service scans proved unsuccessful.

There may be cases where one modem is used for LTE Time Division Simplex (LTE/TDS) service, while the other modem may have full service on a cell. In SGLTE architecture, one modem may be used for LTE/TDS service, while the other modem is used for GSM service. If the other modem is in full service, then it may determine that it is not experiencing an out-of-service condition because of its connection. For example, mobile processor integrated circuit 400, which may be one of the processors of controller/processor 380. Communication may be established through RFFE 402, including through the GPS antenna of antennas 404. With reference to the components of UE 120 illustrated in FIG. 3, the in-service communication may be determined through signaling received over antennas 352a-r, demodulator/modulators 354a-r, MIMO detector 356, and receive processor 358. Mobile processor integrated circuit 400 may determine that it is in a second status that is not experiencing an out-of-service condition. The combination of these components and acts may provide means for determining that a second status exists in response to detection that one other of the two or more modems is not experiencing an out-of-service condition.

When an out-of-service condition occurs, the out-of-service scanning operation can be expensive in terms of power as the mobile equipment scans whole bands of multiple Radio Access Technologies (RATs) (e.g., LTE/WCDMA/TDS/Data Optimized (DO)/CDMA), causing rapid battery drain while performing a scan for full service. This problem can be reduced or avoided by adjusting and/or triggering out-of-service scanning for one of the modems using information from another of the modems that is not experiencing an out-of-service condition. For example, frequent out-of-service scans can be avoided by mobile processor integrated circuit 408 in one modem by utilizing location/motion information from the GPS antenna associated with mobile processor integrated circuit 400 in another modem to determine whether the device is stationary or in motion or in a particular location. This information may be transmitted between modems as control/data 414. The combination of these components and acts may provide means, in response to existence of the first status and the second status, for utilizing information from the other of the two or more modems to make a determination whether a third status exists.

The location/motion information received from the GPS antenna associated with mobile processor integrated circuit 400 indicates to mobile processor integrated circuit 408 whether the mobile device is in the same location or if it is moving. If it is in the same location, mobile processor integrated circuit 408 may determine not to resume out-of-service scans. However, if the information indicates that the mobile device has moved, then mobile processor integrated circuit 408 may determine to resume out-of-service scans. Under control of mobile processor integrated circuit 408, UE 120 may then send out scan signals using transmit processor 365, TX MIMO processor 366, demodulator/modulators 354*a-r*, and antennas 352*a-r*. The combination of these components and acts may provide means for determining, conditioned at least in part on existence of the third status, whether to perform another of the out-of-service scans.

Figure 5:
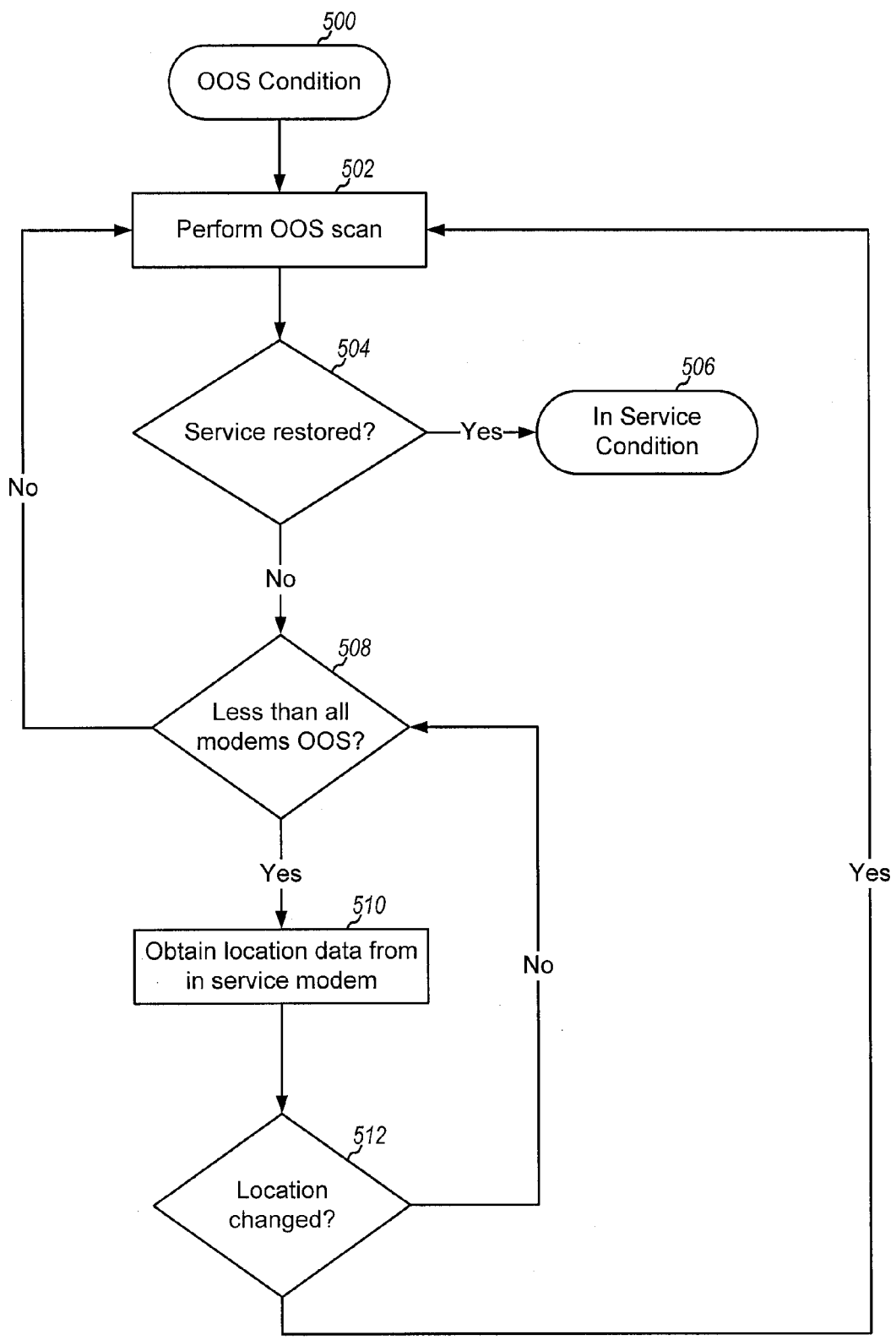
FIG. 5 is a functional block diagram illustrating example blocks executed to implement one aspect of the present disclosure.

Alternatively or additionally, if the two modems have the same operator and service, then one modem can inform the other modem which bandwidths to scan, thus reducing the number of FIG. 5 illustrates a method for performing out-of-service scanning in mobile equipment having two or more modems. Upon entry to an out-of-service condition at block 500, out-of-service scanning may be performed at block 502. In other words, out-of-service scans may be performed for one of the modems. A determination may be made, at block 504, whether the out-of-service scanning successfully restored service. Therefore, a determination may be made whether a first status exists, wherein the first status corresponds to one of the out-of-service scans proving unsuccessful. If the determination of block 504 is that the out-of-service scanning was successful, then an in-service condition may entered at block 506. However, if the determination of block 504 is that the out-of-service scanning was not successful, then another determination may be made at block 508 whether any other modems of the mobile equipment are not experiencing an out-of-service condition. Accordingly, a determination may be made whether a second status exists, wherein the second status corresponds to at least one other of the modems not experiencing an out-of-service condition. If it is determined at block 508 that all other modems are out-of-service, then processing may return to block 502 for further scanning. In other words, a determination may be made, conditioned at least in part on nonexistence of the second status, to perform another of the out-of-service scans. However, if it is determined at block 508 that less than all other modems are out-of-service, then location data may be obtained, at block 510, from one or more of the other in-service modems. Utilizing the location data, a determination may be made, at block 512, whether the location of the mobile equipment has changed, and/or whether the mobile equipment is moving. Therefore, in response to existence of the first status and the second status, information may be utilized from the other of the modems to make a determination whether a third status exists.

In this example, the information relates to location of the mobile equipment, and the third status corresponds to change of location of the mobile equipment. In some aspects, the information may correspond to GPS coordinates, and block 512 may include employing the GPS coordinates to detect change of location of the mobile equipment. In additional or alternative aspects, the information may correspond to a status message indicating that the mobile equipment has experienced a change of location. In other words, the location change information can be provided as a notification from the in-service modem in order to trigger an out-of-service scan by the out-of-service modem. In some aspects, the out-of-service modem may query the in-service modem to provide the notification. If it is determined at block 512 that the mobile equipment is stationary, then processing may return to block 508, and further scanning may be delayed. However, if it is determined at block 512 that the mobile equipment has moved or is moving, then processing may return to block 502 for further scanning. Therefore, a determination may be made, conditioned at least in part on existence of the third status, whether to perform another of the out-of-service scans.

Figure 6:
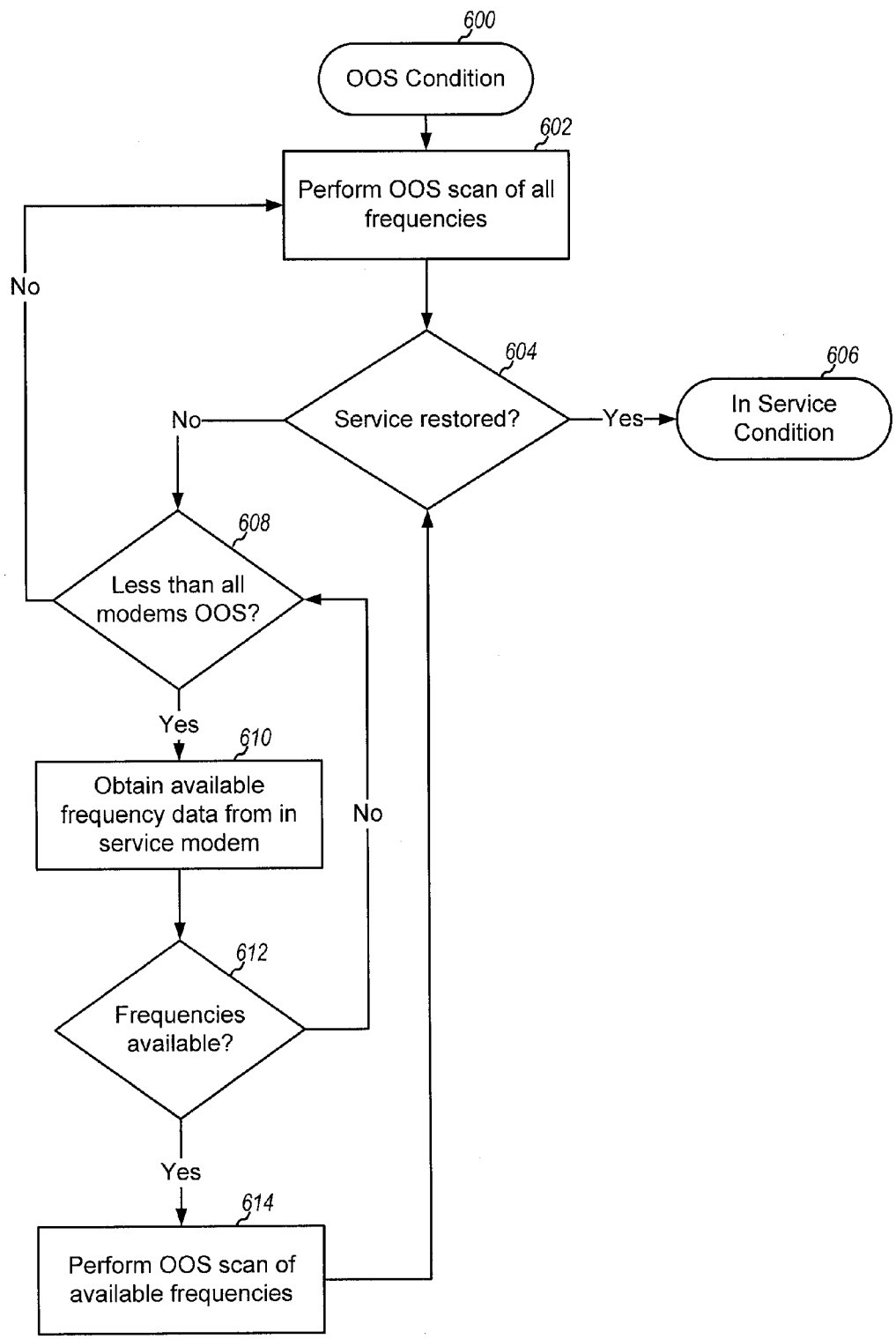
FIG. 6 is a functional block diagram illustrating example blocks executed to implement one aspect of the present disclosure.

FIG. 6 illustrates another method for performing out-of-service scanning in mobile equipment having two or more modems that, for example, share the same operator and same technology. Upon entry to an out-of-service condition at block 600, out-of-service scanning of all frequencies may be performed at block 602. Accordingly, out-of-service scans may be performed for one of the modems. A determination may be made, at block 604, whether the out-of-service scanning successfully restored service. In other words, a determination may be made whether a first status exists, wherein the first status corresponds to one of the out-of-service scans proving unsuccessful. If the determination of block 604 is that the out-of-service scanning was successful, then an in-service condition may entered at block 606. However, if the determination of block 604 is that the out-of-service scanning was not successful, then another determination may be made at block 608 whether any other modems of the mobile equipment are not experiencing an out-of-service condition. Therefore, a determination may be made whether a second status exists, wherein the second status corresponds to at least one other of the modems not experiencing an out-of-service condition. If it is determined at block 608 that all other modems are out-of-service, then processing may return to block 602 for further scanning. Accordingly, a determination may be made, conditioned at least in part on nonexistence of the second status, to perform another of the out-of-service scans. However, if it is determined at block 608 that less than all other modems are out-of-service, then frequency data may be obtained, at block 610, from one or more of the other modems. Utilizing the frequency data, a determination may be made, at block 612, whether there are any frequencies available for scanning. In other words, in response to existence of the first status and the second status, information may be utilized from the other of the modems to make a determination whether a third status exists.

In this example, the information corresponds to frequency information, and the third status corresponds to availability of frequencies for performing the other of the out-of-service scans. If the two modems do not share the same operator and the same technology, then sharing of frequency information may not be available. In some aspects, the frequency information may correspond to one or more status messages indicating availability of one or more frequency bands. In some aspects, the out-of-service modem may query the in-service modem to provide the status messages as notifications to indicate that a new cell has been entered, or any other change in available frequencies. In further aspects, the frequency information can include information about neighbor cells, and a change in neighbor cells may indicate change of location. In additional or alternative aspects, the frequency information may correspond to one or more signal strengths of one or more frequency bands, and block 612 may correspond to determining availability of frequency bands by comparing the signal strengths to predetermined thresholds. If it is determined at block 612 that no frequencies are available for scanning, then processing may return to block 608, and further scanning may be delayed. However, if it is determined at block 612 that frequencies are available, then out-of-service scanning may be performed, at block 614, by scanning only frequencies identified as available for scanning by the frequency information, and processing may return to block 604. Therefore, a determination may be made, conditioned at least in part on existence of the third status, whether to perform another of the out-of-service scans. It should be appreciated that an example implementation of the process illustrated in FIG. 6 may be implemented either to reduce scanning until a change in frequency information is detected (e.g., new cell entered, change in neighbor cells, etc.), or to reduce unnecessary scanning of unavailable frequencies (e.g., scan only available frequency bands).

Figure 7:
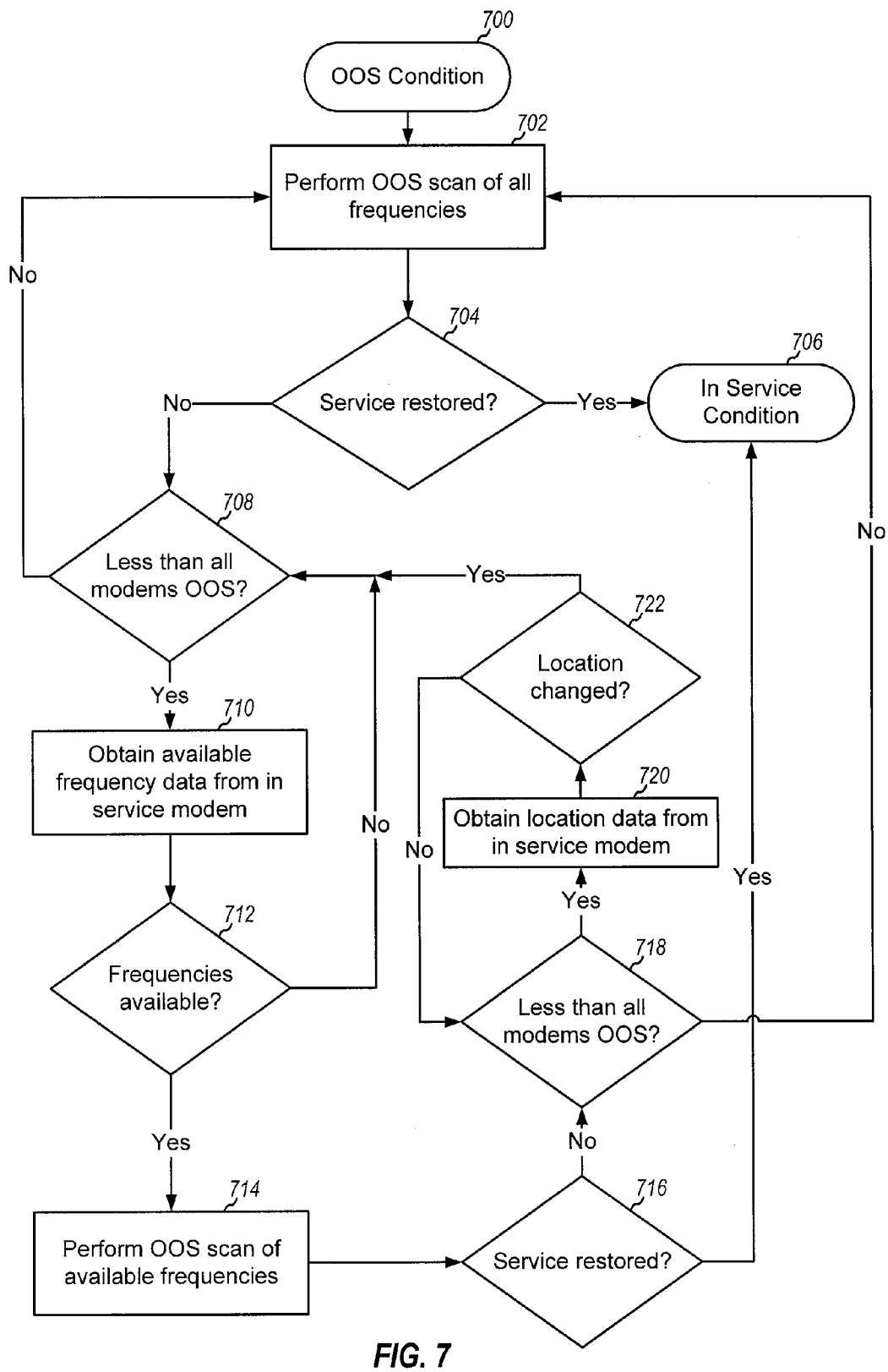
FIG. 7 is a functional block diagram illustrating example blocks executed to implement one aspect of the present disclosure.

FIG. 7 illustrates an additional method for performing out-of-service scanning in mobile equipment having two or more modems that, for example, share the same operator and same technology. Upon entry to an out-of-service condition at block 700, out-of-service scanning of all frequencies may be performed at block 702. Accordingly, out-of-service scans may be performed for one of the modems. A determination may be made, at block 704, whether the out-of-service scanning successfully restored service. In other words, a determination may be made whether a first status exists, wherein the first status corresponds to one of the out-of-service scans proving unsuccessful. If the determination of block 704 is that the out-of-service scanning was successful, then an in-service condition may entered at block 706. However, if the determination of block 704 is that the out-of-service scanning was not successful, then another determination may be made at block 708 whether any other modems of the mobile equipment are not experiencing an out-of-service condition. Therefore, a determination may be made whether a second status exists, wherein the second status corresponds to at least one other of the modems not experiencing an out-of-service condition. If it is determined at block 708 that all other modems are out-of-service, then processing may return to block 702 for further scanning. Accordingly, a determination may be made, conditioned at least in part on nonexistence of the second status, to perform another of the out-of-service scans. However, if it is determined at block 708 that less than all other modems are out-of-service, then frequency data may be obtained, at block 710, from one or more of the other modems. Utilizing the frequency data, a determination may be made, at block 712, whether there are any frequencies available for scanning. In other words, in response to existence of the first status and the second status, information may be utilized from the other of the modems to make a determination whether a third status exists.

In this example, the information corresponds to frequency information, and the third status corresponds to availability of frequencies for performing the other of the out-of-service scans. If the two modems do not share the same operator and the same technology, then sharing of frequency information may not be available. In some aspects, the frequency information may correspond to one or more status messages indicating availability of one or more frequency bands. In some aspects, the out-of-service modem may query the in-service modem to provide the status messages as notifications to indicate that a new cell has been entered, or any other change in available frequencies. In further aspects, the frequency information can include information about neighbor cells, and a change in neighbor cells may indicate change of location. In additional or alternative aspects, the frequency information may correspond to one or more signal strengths of one or more frequency bands, and block 712 may correspond to determining availability of frequency bands by comparing the signal strengths to predetermined thresholds. If it is determined at block 712 that no frequencies are available for scanning, then processing may return to block 708, and further scanning may be delayed. However, if it is determined at block 712 that frequencies are available, then out-of-service scanning may be performed, at block 714, by scanning only frequencies identified as available for scanning by the frequency information, and processing may proceed to block 716. Therefore, a determination may be made, conditioned at least in part on existence of the third status, whether to perform another of the out-of-service scans.

A determination may be made, at block 716, whether the out-of-service scanning successfully restored service. Accordingly, a determination may be made whether the first status still exists, wherein the first status corresponds to one of the out-of-service scans proving unsuccessful. If the determination of block 716 is that the out-of-service scanning was successful, then the in-service condition may be entered at block 706. However, if the determination of block 716 is that the out-of-service scanning was not successful, then another determination may be made at block 718 whether any other modems of the mobile equipment are not experiencing an out-of-service condition. In other words, a determination may be made whether the second status still exists. If it is determined at block 718 that all other modems are out-of-service, then processing may return to block 702 for further scanning. Therefore, a determination may be made, conditioned at least in part on nonexistence of the second status, to perform another of the out-of-service scans. However, if it is determined at block 718 that less than all other modems are out-of-service, then location data may be obtained, at block 720, from one or more of the other modems. Utilizing the location data, a determination may be made, at block 722, whether the location of the mobile equipment has changed, and/or whether the mobile equipment is moving. Accordingly, in response to existence of the first status and the second status, information may be utilized from the other of the modems to make a determination whether a third status exists.

In this example, the information additionally relates to location of the mobile equipment, and the third status additionally corresponds to change of location of the mobile equipment. In some aspects, the information may correspond to GPS coordinates, and block 722 may include employing the GPS coordinates to detect change of location of the mobile equipment. In additional or alternative aspects, the information may correspond to a status message indicating that the mobile equipment has experienced a change of location. In other words, the location change information can be provided as a notification from the in-service modem in order to trigger an out-of-service scan by the out-of-service modem. In some aspects, the out-of-service modem may query the in-service modem to provide the notification. If it is determined at block 722 that the mobile equipment is stationary, then processing may return to block 718, and further scanning may be delayed. However, if it is determined at block 722 that the mobile equipment has moved or is moving, then processing may return to block 708 for further scanning, conditioned on availability of frequencies. In other words, a determination may be made, conditioned at least in part on existence of the third status, whether to perform another of the out-of-service scans. It should be appreciated that an example implementation of the process illustrated in FIG. 7 may implement an inner loop formed of blocks 718-722 to reduce scanning until a location change is detected, and implement an outer loop formed of blocks 708-716 to reduce unnecessary scanning of unavailable frequencies (e.g., scan only available frequency bands).

Figure 8:
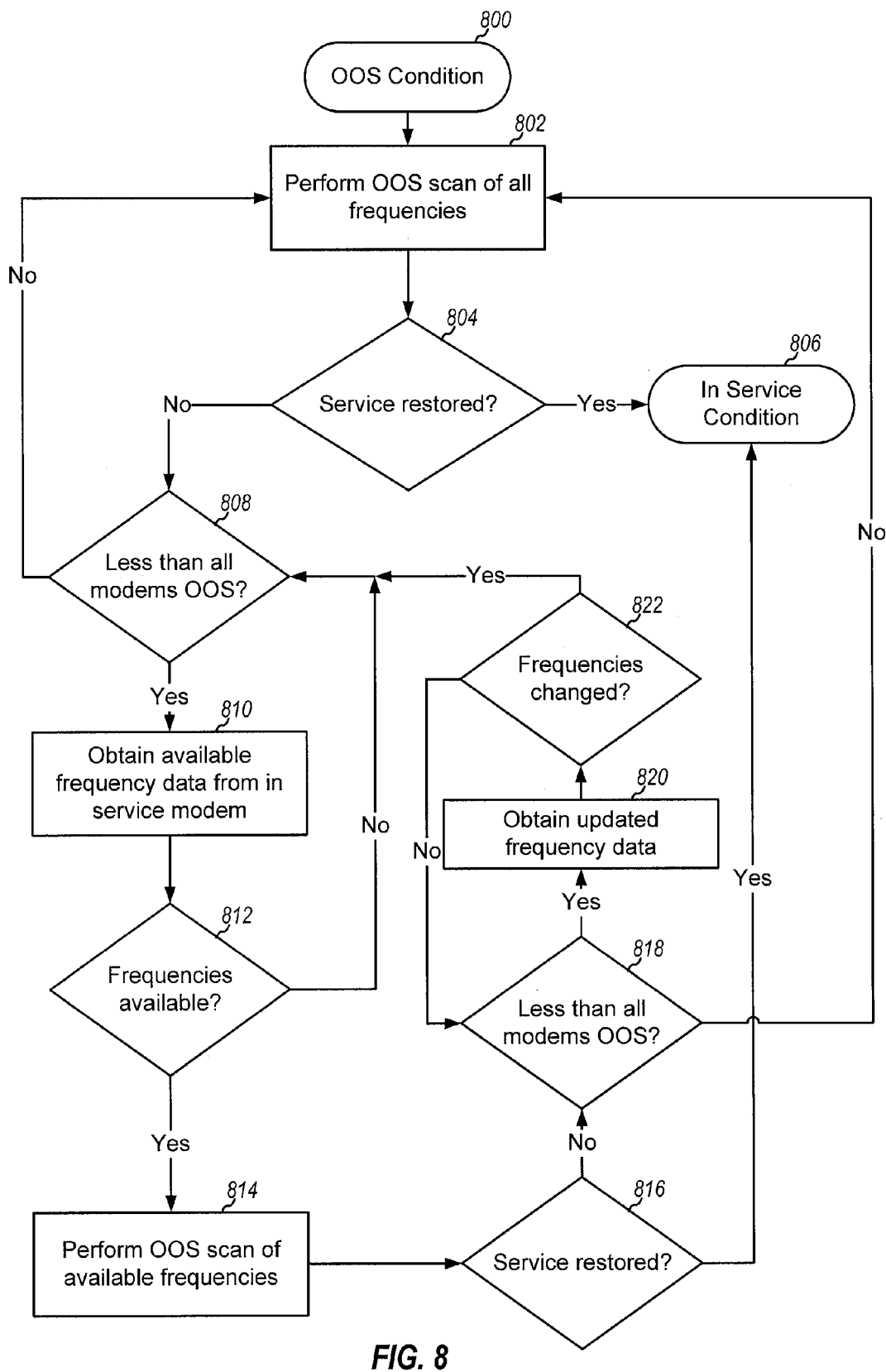
FIG. 8 is a functional block diagram illustrating example blocks executed to implement one aspect of the present disclosure.

FIG. 8 illustrates a further method for performing out-of-service scanning in mobile equipment having two or more modems that, for example, share the same operator and same technology. Upon entry to an out-of-service condition at block 800, out-of-service scanning of all frequencies may be performed at block 802. Therefore, out-of-service scans may be performed for one of the modems. A determination may be made, at block 804, whether the out-of-service scanning successfully restored service. Accordingly, a determination may be made whether a first status exists, wherein the first status corresponds to one of the out-of-service scans proving unsuccessful. If the determination of block 804 is that the out-of-service scanning was successful, then an in-service condition may be entered at block 806. However, if the determination of block 804 is that the out-of-service scanning was not successful, then another determination may be made at block 808 whether any other modems of the mobile equipment are not experiencing an out-of-service condition. In other words, a determination may be made whether a second status exists, wherein the second status corresponds to at least one other of the modems not experiencing an out-of-service condition. If it is determined at block 808 that all other modems are out-of-service, then processing may return to block 802 for further scanning. Therefore, a determination may be made, conditioned at least in part on nonexistence of the second status, to perform another of the out-of-service scans. However, if it is determined at block 808 that less than all other modems are out-of-service, then frequency data may be obtained, at block 810, from one or more of the other modems. Utilizing the frequency data, a determination may be made, at block 812, whether there are any frequencies available for scanning. Accordingly, in response to existence of the first status and the second status, information may be utilized from the other of the modems to make a determination whether a third status exists.

In this example, the information corresponds to frequency information, and the third status corresponds to availability of frequencies for performing the other of the out-of-service scans. If the two modems do not share the same operator and the same technology, then sharing of frequency information may not be available. In some aspects, the frequency information may correspond to one or more status messages indicating availability of one or more frequency bands. In some aspects, the out-of-service modem may query the in-service modem to provide the status messages as notifications to indicate that a new cell has been entered, or any other change in available frequencies. In further aspects, the frequency information can include information about neighbor cells, and a change in neighbor cells may indicate change of location. In additional or alternative aspects, the frequency information may correspond to one or more signal strengths of one or more frequency bands, and block 812 may correspond to determining availability of frequency bands by comparing the signal strengths to predetermined thresholds. If it is determined at block 812 that no frequencies are available for scanning, then processing may return to block 808, and further scanning may be delayed. However, if it is determined at block 812 that frequencies are available, then out-of-service scanning may be performed, at block 814, by scanning only frequencies identified as available for scanning by the frequency information, and processing may proceed to block 816. In other words, a determination may be made, conditioned at least in part on existence of the third status, whether to perform another of the out-of-service scans.

A determination may be made, at block 816, whether the out-of-service scanning successfully restored service. Therefore, a determination may be made whether the first status still exists, wherein the first status corresponds to one of the out-of-service scans proving unsuccessful. If the determination of block 816 is that the out-of-service scanning was successful, then the in-service condition may be entered at block 806. However, if the determination of block 816 is that the out-of-service scanning was not successful, then another determination may be made at block 818 whether any other modems of the mobile equipment are not experiencing an out-of-service condition. Accordingly, a determination may be made whether the second status still exists. If it is determined at block 818 that all other modems are out-of-service, then processing may return to block 802 for further scanning. In other words, a determination may be made, conditioned at least in part on nonexistence of the second status, to perform another of the out-of-service scans. However, if it is determined at block 818 that less than all other modems are out-of-service, then updated frequency data may be obtained, at block 820, from one or more of the other modems. Utilizing the updated frequency data, a determination may be made, at block 822, whether the available frequencies have changed. Therefore, in response to existence of the first status and the second status, information may be utilized from the other of the modems to make a determination whether a third status exists.

In this example, the information additionally relates to change in frequency information, and the third status additionally corresponds to a change in available frequencies for performing the other of the out-of-service scans. If the two modems do not share the same operator and the same technology, then sharing of frequency information may not be available. In some aspects, the information may correspond to one or more status messages indicating availability of one or more frequency bands and/or change in availability in one or more frequency bands. In some aspects, the out-of-service modem may query the in-service modem to provide the status messages as notifications to indicate that a new cell has been entered, or any other change in available frequencies. In further aspects, the frequency information can include information about neighbor cells, and a change in neighbor cells may indicate change of location. In additional or alternative aspects, the frequency information may correspond to one or more signal strengths of one or more frequency bands, and block 822 may correspond to determining change in availability of frequency bands by comparing the updated signal strengths to previously received signal strengths. If it is determined at block 822 that the available frequencies have not changed, then processing may return to block 818, and further scanning may be delayed. However, if it is determined at block 822 that the available frequencies have changed, then processing may return to block 808 for further scanning, conditioned on availability of frequencies. Accordingly, a determination may be made, conditioned at least in part on existence of the third status, whether to perform another of the out-of-service scans. It should be appreciated that an example implementation of the process illustrated in FIG. 8 may implement an inner loop formed of blocks 818-822 to reduce scanning until a change in frequency information is detected (e.g., new cell entered, change in neighbor cells, etc.), and implement an outer loop formed of blocks 708-716 to reduce unnecessary scanning of unavailable frequencies (e.g., scan only available frequency bands).

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for performing out-of-service scanning in mobile equipment having two or more modems, the method comprising:
   performing out-of-service scans for one of the two or more modems;
   determining that a first status exists in response to detection that one of the out-of-service scans proved unsuccessful;
   determining that a second status exists in response to detection that one other of the two or more modems is not experiencing an out-of-service condition;
   in response to existence of the first status and the second status, utilizing information from the other of the two or more modems to determine whether a third status exists; and
   determining, conditioned at least in part on existence of the third status, whether to perform another of the out-of-service scans.

2. The method of claim 1, wherein the information from the other of the two or more modems corresponds to information relating to location of the mobile equipment.

3. The method of claim 2, wherein the third status corresponds to change of location of the mobile equipment.

4. The method of claim 2, wherein the information relating to location of the mobile equipment corresponds to global positioning system (GPS) coordinates, and the method further includes:
  employing the GPS coordinates to detect change of location of the mobile equipment.

5. The method of claim 2, wherein the information relating to location of the mobile equipment corresponds to a status message indicating that the mobile equipment has experienced a change of location.

6. The method of claim 1, wherein the information from the other of the two or more modems corresponds to frequency information.

7. The method of claim 6, wherein the third status corresponds to availability of frequencies for performing the other of the out-of-service scans.

8. The method of claim 7, further including:
  performing the other of the out-of-service scans by scanning only frequencies identified, by the frequency information, as available for scanning.

9. The method of claim 6, wherein the third status corresponds to a change in available frequencies for performing the other of the out-of-service scans.

10. The method of claim 1, further including:
  determining, conditioned at least in part on nonexistence of the second status, to perform another of the out-of-service scans.

11. The method of claim 1, further including:
  querying, in response to existence of the first status and the second status, the other of the two or more modems for a notification indicating that the third status exists.

12. An apparatus for performing out-of-service scanning in mobile equipment having two or more modems, said apparatus comprising:
  means for performing out-of-service scans for one of the two or more modems;
  means for determining that a first status exists in response to detection that one of the out-of-service scans proved unsuccessful;
  means for determining that a second status exists in response to detection that one other of the two or more modems is not experiencing an out-of-service condition;
  means, in response to existence of the first status and the second status, for utilizing information from the other of the two or more modems to determine whether a third status exists; and
  means for determining, conditioned at least in part on existence of the third status, whether to perform another of the out-of-service scans.

13. The apparatus of claim 12, wherein the information from the other of the two or more modems corresponds to information relating to location of the mobile equipment.

14. The apparatus of claim 13, wherein the third status corresponds to change of location of the mobile equipment.

15. The apparatus of claim 13, wherein the information relating to location of the mobile equipment corresponds to global positioning system (GPS) coordinates, and the apparatus further includes:
  means for employing the GPS coordinates to detect change of location of the mobile equipment.

16. The apparatus of claim 13, wherein the information relating to location of the mobile equipment corresponds to a status message indicating that the mobile equipment has experienced a change of location.

17. The apparatus of claim 12, wherein the information from the other of the two or more modems corresponds to frequency information.

18. The apparatus of claim 17, wherein the third status corresponds to availability of frequencies for performing the other of the out-of-service scans.

19. The apparatus of claim 18, further including:
  means for performing the other of the out-of-service scans by scanning only frequencies identified, by the frequency information, as available for scanning.

20. The apparatus of claim 17, wherein the third status corresponds to a change in available frequencies for performing the other of the out-of-service scans.

21. The apparatus of claim 12, further including:
  means for determining, conditioned at least in part on nonexistence of the second status, to perform another of the out-of-service scans.

22. The apparatus of claim 12, further including:
  means for querying, in response to existence of the first status and the second status, the other of the two or more modems for a notification indicating that the third status exists.

23. A computer program product comprising
a non-transitory computer-readable medium including:
  code for causing a computer to perform, in mobile equipment having two or more modems, out-of-service scans for one of the two or more modems;
  code for causing a computer to determine that a first status exists in response to detection that one of the out-of-service scans proved unsuccessful;
  code for causing a computer to determine that a second status exists in response to the detection that one other of the two or more modems is not experiencing an out-of-service condition;
  code for causing a computer, in response to existence of the first status and the second status, to utilize information from the other of the two or more modems to determine whether a third status exists; and
  code for causing a computer to determine, conditioned at least in part on existence of the third status, whether to perform another of the out-of-service scans.

24. The computer program product of claim 23, wherein the information from the other of the two or more modems corresponds to information relating to location of the mobile equipment.

25. The computer program product of claim 24, wherein the third status corresponds to change of location of the mobile equipment.

26. The computer program product of claim 24, wherein the information relating to location of the mobile equipment corresponds to global positioning system (GPS) coordinates, and the non-transitory computer-readable medium further includes:
  code for causing a computer to employ the GPS coordinates to detect change of location of the mobile equipment.

27. The computer program product of claim 24, wherein the information relating to location of the mobile equipment corresponds to a status message indicating that the mobile equipment has experienced a change of location.

28. The computer program product of claim 23, wherein the information from the other of the two or more modems corresponds to frequency information.

29. The computer program product of claim 28, wherein the third status corresponds to availability of frequencies for performing the other of the out-of-service scans.

30. The computer program product of claim 29, wherein the non-transitory computer-readable medium further includes:

code for causing a computer to perform the other of the out-of-service scans by scanning only frequencies identified, by the frequency information, as available for scanning.

31. The computer program product of claim 28, wherein the third status corresponds to a change in available frequencies for performing the other of the out-of-service scans.

32. The computer program product of claim 23, wherein the non-transitory computer-readable medium further includes:
   code for causing a computer to determine, conditioned at least in part on nonexistence of the second status, to perform another of the out-of-service scans.

33. The computer program product of claim 23, wherein the non-transitory computer-readable medium further includes:
   code for causing a computer to query, in response to existence of the first status and the second status, the other of the two or more modems for a notification indicating that the third status exists.

34. A user equipment (UE) having two or more modems, the UE comprising:
   at least one processor; and
   a memory coupled to said at least one processor,
   wherein said at least one processor is configured to:
      perform out-of-service scans for one of the two or more modems;
      determine that a first status exists in response to detection that one of the out-of-service scans proved unsuccessful;
      determine that a second status exists in response to detection that one other of the two or more modems is not experiencing an out-of-service condition;
      utilize, in response to existence of the first status and the second status, information from the other of the two or more modems to determine whether a third status exists; and
      determine, conditioned at least in part on existence of the third status, whether to perform another of the out-of-service scans.

35. The UE of claim 34, wherein the information from the other of the two or more modems corresponds to information relating to location of the UE.

36. The UE of claim 35, wherein the third status corresponds to change of location of the UE.

37. The UE of claim 35, wherein the information relating to location of the UE corresponds to global positioning system (GPS) coordinates, and the at least one processor is configured to:
   employ the GPS coordinates to detect change of location of the UE.

38. The UE of claim 35, wherein the information relating to location of the UE corresponds to a status message indicating that the UE has experienced a change of location.

39. The UE of claim 34, wherein the information from the other of the two or more modems corresponds to frequency information.

40. The UE of claim 39, wherein the third status corresponds to availability of frequencies for performing the other of the out-of-service scans.

41. The UE of claim 40, wherein the at least one processor is configured to:
   perform the other of the out-of-service scans by scanning only frequencies identified, by the frequency information, as available for scanning.

42. The UE of claim 40, wherein the third status corresponds to a change in available frequencies for performing the other of the out-of-service scans.

43. The UE of claim 34, wherein the at least one processor is configured to:
   determine, conditioned at least in part on nonexistence of the second status, to perform another of the out-of-service scans.

44. The UE of claim 34, wherein the at least one processor is configured to:
   query, in response to existence of the first status and the second status, the other of the two or more modems for a notification indicating that the third status exists.

* * * * *